United States Patent [19]
Kiwaki et al.

[11] 3,737,760
[45] June 5, 1973

[54] VOLTAGE CONTROL APPARATUS FOR AN ALTERNATING CURRENT GENERATOR

[75] Inventors: Hisakatsu Kiwaki; Hiroshi Sato; Takeo Kuwabara, all of Katsuta-shi, Japan

[73] Assignee: Hitachi, Ltd., Tokyo, Japan

[22] Filed: Oct. 12, 1971

[21] Appl. No.: 188,333

[30] Foreign Application Priority Data

Oct. 12, 1970 Japan ............................ 45/88829

[52] U.S. Cl. ....................... 322/28, 322/73, 322/76, 323/89 R, 323/91
[51] Int. Cl. .............................................. H02p 9/30
[58] Field of Search ..................... 322/20, 24, 28, 32, 322/73, 75, 76; 323/89 R, 91

[56] References Cited
UNITED STATES PATENTS

| | | | |
|---|---|---|---|
| 3,499,168 | 3/1970 | Dinger | 322/28 |
| 2,797,382 | 6/1957 | Woerdemann | 322/28 X |
| 3,121,836 | 2/1964 | Rosenberry | 322/32 X |
| 3,257,605 | 6/1966 | Hysler et al. | 323/89 R |

Primary Examiner—J. D. Miller
Assistant Examiner—H. Huberfeld
Attorney—Craig, Antonelli & Hill

[57] ABSTRACT

A voltage control apparatus for an alternating current generator comprising an alternating current generator which is self-excited, an electric motor for driving the generator, a control rectifier arrangement for exciting the field winding of the generator by rectifying the output voltage of the generator, a phase shifter for controlling the control rectifier, a saturable reactor excited by the output of the generator, a rectifier for rectifying the current flowing through the reactor to supply a control input for the phase shifter, and a resistor connected across the alternating current terminals of the rectifier to bypass the current of the reactor.

14 Claims, 7 Drawing Figures

VOLTAGE CONTROL APPARATUS FOR AN ALTERNATING CURRENT GENERATOR

BACKGROUND OF THE INVENTION

This invention relates to a voltage control apparatus for an alternating current generator, particularly for a self-excited alternating current generator.

A conventional alternating current generator driven by an electric motor generally has an automatic voltage control apparatus and/or an automatic frequency control apparatus. These apparatus control the output voltage or the frequency of the output voltage of the alternating current generator to maintain these parameters constant irrespective of the speed of the motor driving the generator.

Where, however, the output of the generator is supplied to equipment having a considerably large time constant, the control as described above is not always necessary. For instance, in the alternating current generator which is used for an auxiliary electric source in electric railway rolling stock, the motor for driving the generator is supplied with voltage derived from a contact wire. The voltage of the contact wire changes within a range from $-40$ percent to $+20$ percent for a rated voltage. Therefore, the speed of the motor varies in a wide range, so that the output voltage or the frequency of the voltage of the generator changes according to the change in speed of the motor.

On the other hand, cooling and warming equipment supplied by such a generator have a large time constant. Thus, a small voltage change will scarcely affect the cooling or warming operation. In such a case, it is inadvisable to control the voltage and the frequency to maintain these parameters constant irrespective of the speed of the motor. The reason is as follows. The load and the generator show a low impedance for a low frequency of the output voltage, and a large current flows through the load and the generator. As a result, it is required that the alternating current generator has a large current capacity. Further, when the frequency of the output voltage is high, the impedance becomes high and an extremely high voltage becomes necessary in order to produce the required current.

The present inventors have investigated a new apparatus, in which the output voltage of the generator is controlled in proportion to the frequency. This apparatus has an automatic voltage control apparatus which provides a reference for the output voltage by means of a saturable reactor excited by the alternating current generator.

Generally speaking, if the cross-sectional area of a core of the saturable reactor is A, the number of turns of a winding wound on the core is N, the saturation magnetic flux density is Bm, the voltage applied to the winding is Ea, and the frequency of the voltage is f, the following equation holds in such the saturable reactor as described above:

$$Ea = 4.44 \, BmfAN$$

Accordingly, $$Ea/f = 4.44 \, BmAN = K \text{ (constant)} \tag{1}$$

If the voltage appearing across the winding is used as the reference, it will be proportional to the frequency of the voltage.

This apparatus still has inconvenient features, such as troubles caused by the exciting current of the saturable reactor, a non-linearity of the saturation characteristic of the core, and an error in the saturation magnetic flux density or the number of turns of the windings produced in the manufacturing process.

SUMMARY OF THE INVENTION

An object of this invention is to provide a voltage control apparatus which eliminates or otherwise avoids the disadvantages inherent in known systems of this type.

According to one embodiment of this invention, a voltage control apparatus for an alternating current generator has an alternating current generator, a motor for driving the generator, a control rectifier for exciting a field winding of the generator by rectifying an output voltage of the generator, a phase shifter for controlling the control rectifier, a saturable reactor excited by the output voltage of the generator, a rectifier for rectifying a current flowing through the reactor in order to supply a control input for the phase shifter, and bypassing means provided in an alternating current side of the rectifier to bypass the current of the reactor.

Other objects and features of this invention will become apparent upon reading the specification and inspection of the drawings and will be particularly pointed out in the claims.

DETAILED DESCRIPTION OF THE PREFERRED EMBODIMENT

Figure 1:
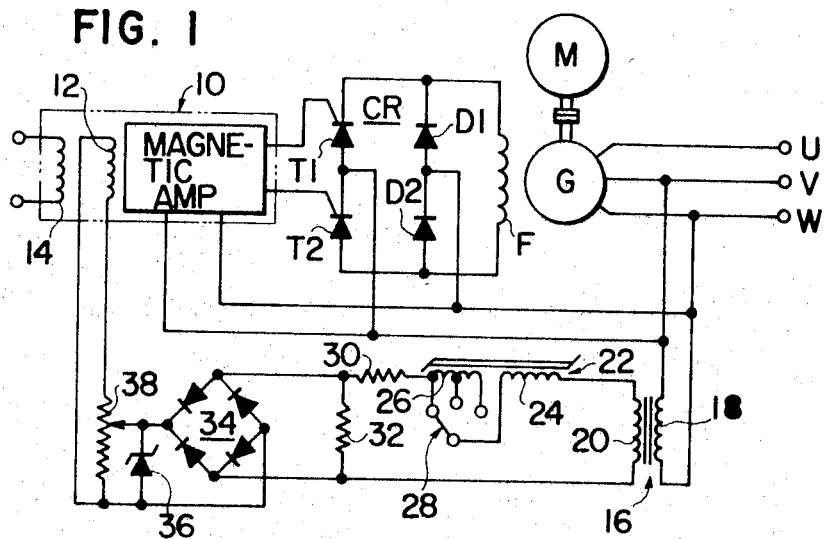
FIG. 1 is a schematic circuit diagram of a preferred embodiment according to this invention.

Referring to FIG. 1, an alternating current generator G is driven by an electric motor M. The electric source connected to the motor M is omitted from the drawing. The voltage generated by the generator G can be taken from terminals U, V, and W. A control rectifier circuit CR provides a direct current for the field winding F of the generator G. The rectifier circuit CR comprises diodes D1, D2, and thyristors T1, T2. An input voltage to the rectifier circuit CR is derived from the output voltage of the generator G. Namely, the generator G is a self-excited alternating current generator.

The thyristors T1 and T2 are controlled by the phase shifter 10 so as to adjust the current of the field winding F. The phase shifter 10 may consist of a conventional magnetic amplifier. Numerals 12 and 14 designate control input windings for the magnetic amplifier.

The primary winding 18 of a transformer 16 is connected between any two phases of the three phase alternating current output voltage. One end of a secondary winding 20 of the transformer 16 is connected to a main winding 24 of a saturable reactor 22. The transformer 16 is provided to match the output voltage of the generator G with the voltage of the control circuit.

The saturable reactor 22 also has an auxiliary winding 26 which is capable of providing a variable number of turns by means of a changeover switch 28. The total number of turns of the saturable reactor 22 is adjusted by changing the changeover switch 28. A resistor 30 restrains the exciting current of the saturable reactor 22. A resistor 32 bypasses the exciting current in order to eliminate any undesirable effect caused by a forward voltage drop in the rectifier bridge 34.

A zener diode 36 limits the quantity of a feedback within a predetermined range. Although a more detailed reason is provided later, if the quantity of the feedback exceeds the predetermined range the feedback control is brought into a positive feedback range; as a result, the voltage control becomes impossible. A resistor 38 adjusts the quantity of the feedback.

The operation of the apparatus above described is as follows. In the saturable reactor 22, the equation (1) holds as described already. Even though the output voltage of the generator G becomes higher than the voltage $Ea$ $(= kf)$, the voltage across the saturable reactor 22 does not exceed the voltage $Ea$. Further, the characteristic of the output current of the saturable reactor 22 vs. the voltage of the generator G is ideally as shown by the dotted line in FIG. 2. If the resistance of the windings 24 and 26 is negligibly small, the dotted line becomes more vertical.

The resistance value of the resistor 30 is selected so as to place the operating point of the saturable reactor 22 at a predetermined point on the dotted line. The current, which flows through the saturable reactor 22 and establishes the operating point thereof, is rectified by the rectifier bridge 34 and is always applied to the control input winding 12 through the resistor 38. Therefore, a bias current corresponding to the above-mentioned current must be applied to the other control input winding 14.

In such a circuit, the output current of the saturable reactor 22 changes according to the voltage difference between the output voltage of the generator G and the voltage $Ea$ of the saturable reactor 22. If the output voltage of the generator G is equal to the voltage $Ea$, the feedback current applied to the winding 12 is opposed by the bias current applied to the winding 14. Then, the phase shifter 10 controls the thyristors T1 and T2 so as to maintain the rated voltage of the generator G.

If the output voltage of the generator G exceeds the voltage $Ea$, the feedback current increases so that the phase shifter 10 controls the thyristors T1 and T2 so as to decrease the field current, and vice versa.

However, if the resistor 32 is omitted, the output current of the saturable reactor 22 always flows through the two diodes of the rectifier bridge 34. A voltage drop $2ed$ is produced in these diodes; therefore, the equation (1) changes as follows:

$$Ea = kf + 2ed \quad (2)$$

where the voltage $ed$ is the forward voltage drop per diode (normally about $0.6 \approx 1$ V). The forward voltage drop $2ed$ becomes an error in the reference voltage, since the voltage $Ea$ is not proportional only to the frequency $f$. The effect of the voltage $2ed$ becomes large as the frequency $f$ becomes low. In other words, the circuit without the resistor 32 shows that the operation is such that the reference voltage becomes always larger than the voltage $Ea$ $(= kf)$ established by the saturable reactor 22 itself by the amount of the error voltage $2ed$.

Figure 2:
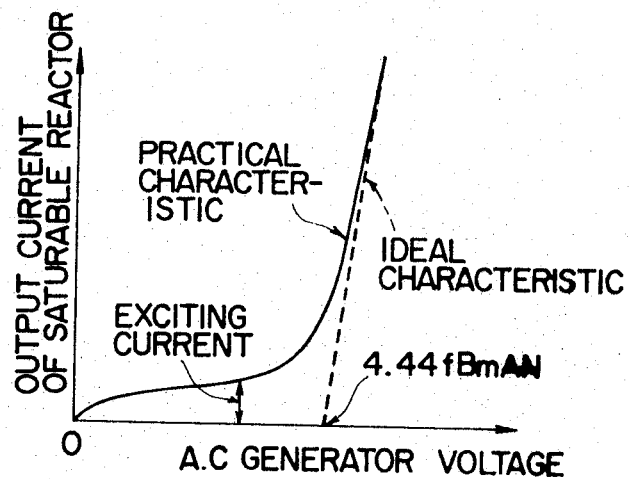
FIG. 2 is a characteristic of the output current of a saturable reactor vs. the output voltage of an alternating current generator.

Further, a practical characteristic of the output current of the saturable reactor 22 vs. the voltage of the generator G is as shown by the solid line in FIG. 2. The characteristic shown by the dotted line is the ideal, but practically unattainable, characteristic. Namely, although the output voltage of the generator G is below the reference voltage in this case, the exciting current of the saturable reactor 22, as shown in FIG. 2, flows to the winding 12. An additional current corresponding to the exciting current is further required as the bias current of the winding 14.

For the purpose of eliminating these inconvenient features, the resistor 32 partially bypasses the output current of the saturable reactor 22. The resistance value of the resistor 32 is selected so as to make its voltage drop smaller than the forward voltage drop $2ed$ of the diodes.

Figure 3:
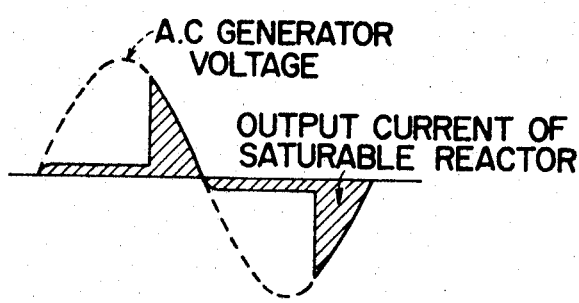
FIG. 3 is a wave form diagram of the output current of the saturable reactor.

The practical characteristic has a non-linear portion in the region of the saturation voltage, as shown in FIG. 2, since the characteristic of a real core is not perfectly angular. The operating point must be selected in the part of the considerably large output current of the saturable reactor 22. In such a control region, the wave form of the output current of the saturable reactor 22 is as shown in FIG. 3. It is apparent from FIG. 3 that the peak value of the output current of the saturable reactor 22 is remarkably large, as compared with a mean value thereof. Accordingly, each diode of the rectifier bridge 34 must be able to endure such a large current; however, this is very uneconomical. However, the resistor 32 also shunts this large current after the saturable reactor 22 saturates, so that the burden of each diode is reduced thereby. If the resistor 32 is a variable resistor, it is, of course, possible to omit the resistor 38.

There are some other causes which produce an error in the reference voltage, for example, a dispersion in the saturation magnetic flux density and the number of turns of the windings produced in the manufacturing process.

If the real saturation magnetic flux density of the core of the saturable reactor 22 is smaller than the expected value $Bm$ by $\Delta Bm$, the reference voltage decreases down to $(Bm - \Delta Bm) Ea/Bm$. Then, the number of turns $\Delta N$ of the auxiliary winding 26 is added to the number of turns N of the main winding 24 by operating the changeover switch 28. The number of turns $\Delta N$ must be selected as follows:

$$(Bm - \Delta Bm/Bm) \times (N - \Delta N/N) = 1 \quad (3)$$

On the contrary, in such a case where the saturation magnetic flux density is larger by $\Delta Bm$, a part of the auxiliary winding 26 is connected differentially to the main winding 24, so that the number of turns $N$ of the main winding 24 is decreased functionally by the number of turns $\Delta N$. The polarity of the auxiliary winding 26, therefore, must be able to be changed in order to add or substract the number of turns $\Delta N$ of the auxiliary winding 26 to or from the number of turns N of the main winding 24. This is achieved by a well known method. The auxiliary winding 26 can also correct errors in a cross-sectional area of the core or the number of turns N of the main winding 24 besides the above mentioned dispersion in the saturation magnetic flux density Bm.

Figure 4:
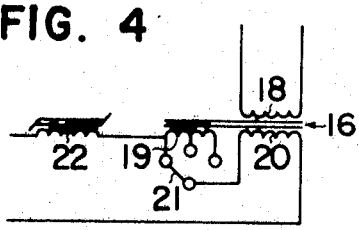
FIG. 4 is a schematic circuit diagram of a part of another embodiment according to this invention.

Further, the above-described correction of the error in the reference voltage can be achieved by the transformer 16. In this case, an auxiliary winding is provided on the primary side or the secondary side of the transformer 16. The circuit shown in FIG. 4 has the auxiliary winding 19 capable of changing the number of turns $\Delta N_2$ on the secondary side. Changing the number of turns $\Delta N_2$ is performed by a changeover switch 21. An adjustment in this case is as follows.

Figure 5:
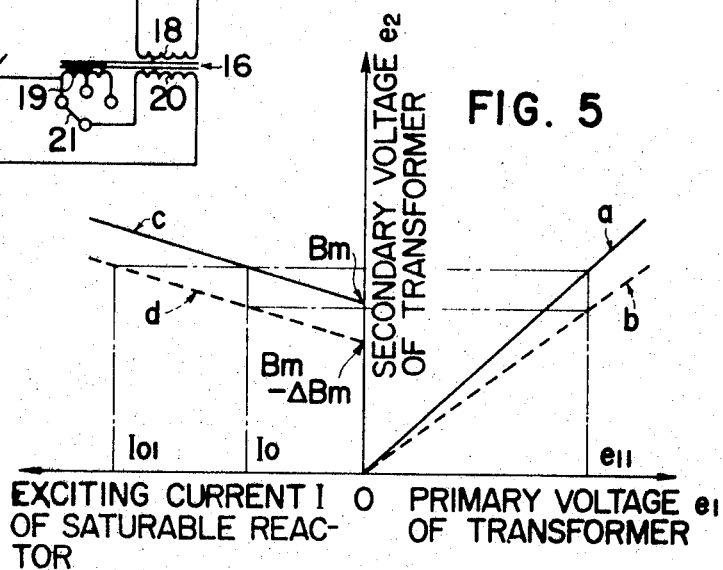
FIG. 5 is a diagram for explaining the operation of the circuit of FIG. 4.

It is assumed here that the relation between a primary voltage $e_1$ of the transformer 16, that is the output voltage of the generator G, and the secondary voltage $e_2$ thereof is as shown in line a in FIG. 5, and that the relation between the secondary voltage $e_2$ and the exciting current I of the saturable reaction 22 is as shown in line c in FIG. 5. But, the number of turns of the main winding 20 is $N_2$, and the saturation magnetic flux density of the core is Bm. In such a case, when $e_1 = e_{11}$, the exciting current becomes Io, as shown in the drawing. Further, if the saturation magnetic flux density becomes $Bm - \Delta Bm$, the exciting current becomes $Io_1$ since the relation of $e_2$ vs. I becomes as shown in line d so that the reference voltage changes.

Then, if a part $\Delta N_2$ of the auxiliary winding 19 is connected differentially to the main winding 20, the relation of $e_1$ vs. $e_2$ becomes as shown in line b in FIG. 5. As a result, when $e_1 = e_{11}$, the exciting current may be maintained at the same value Io. The value $\Delta N_2$ is selected to satisfy the following equation:

$$(Bm - \Delta Bm/Bm) = (N_2 - \Delta N_2/N_2)$$

(4)

An adjustment in the transformer 16 as described above can be also performed on the primary side thereof.

Since the errors in the saturation magnetic flux density, the cross-sectional area of the core and the winding exist certainly in practical cases, an extremely large effect is actually produced by an application of the correction as mentioned above.

Further, the transformer 16 matches the output voltage of the generator G with the voltage of the control circuit. If there is no transformer 16, a large size core and a large number of winding turns will be required in the saturable reactor 22 when the output voltage of the generator G is high. These requirements are inconvenient from the standpoint of weight and economy. The transformer 16 steps down the output voltage of the generator G in order to eliminate these inconveniences. If the output voltage of the generator G is low, the accuracy of control is increased by stepping up the output voltage of the generator G by means of the transformer 16.

Figure 6:
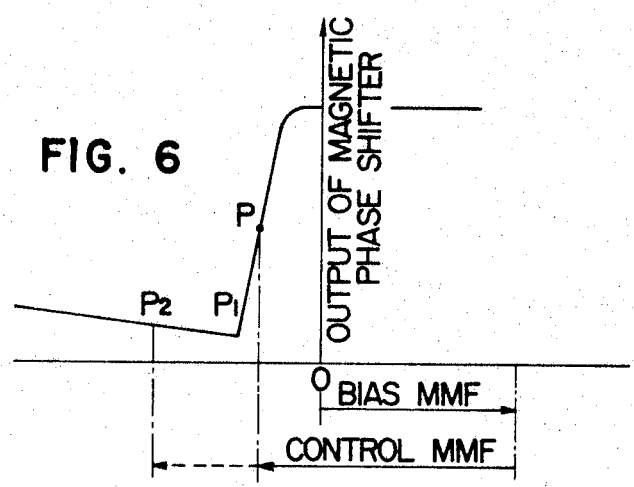
FIG. 6 is a characteristic diagram of a magnetic phase shifter which is used in the circuit of FIG. 1.

The magnetic amplifier used as the phase shifter 10 generally has a characteristic as shown in FIG. 6. The bias magnetomotive force (MMF) applied to the winding 14 and the control MMF applied to the winding 12 are selected so as to position the operating point of the phase shifter 10 near a point P as shown in FIG. 6.

If the output voltage of the generator G increases for some reason, the output current of the saturable reactor 22 increases, so that the control MMF increases and the point P is shifted in a direction whereby the output of the phase shifter 10 decreases. The increase of the output voltage of the generator G is restrained thereby. In the same manner, if the output voltage of the generator G decreases, the point P is shifted in a direction whereby the output of the phase shifter 10 increases. The output voltage of the generator G increases, therefore. As explained above, changes in the output voltage of the generator G are restrained by the function of the saturable reactor 22 in a normal load condition.

The function of the voltage control, however, is occasionally lost in a special load condition. The aforementioned special load condition means that the load has a lagging power factor, such as an induction electric motor.

As well known, the output voltage (terminal voltage) of an alternating current generator is decreased by the influence of the armature reaction in a lagging power factor load. In this case, the field current of the generator needs to be large in order to maintain a predetermined output voltage. In the circuit as shown in FIG. 1, under these conditions, for instance breaking a full load, the output voltage of the generator G increases suddenly. The output of the phase shifter 10 begins to decrease with its own lag. The output voltage of the generator G cannot decrease suddenly since there is a lag in the field winding F of the generator G. The operating point of the phase shifter 10, therefore, arrives at a point $P_2$ beyond the point $P_1$. The region represented by the point $P_2$ is a positive feedback region. The function of the voltage control is lost in this region, so that the output voltage of the generator G increases unusually.

The zener diode 36 is a limiter which is provided to limit an abnormally large control MMF, as described above. The zener voltage of this diode 36 is selected so as not to be rendered conductive by a normal voltage rise, but becomes conductive in response to an abnormal voltage rise, as described above. By rendering the diode 36 conductive, the phase shifter 10 is prevented from making the operating point enter into the positive feedback region.

Figure 7:
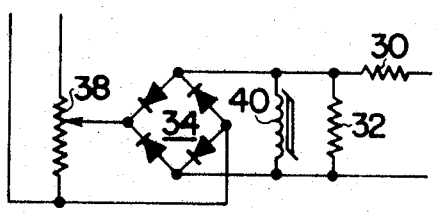
FIG. 7 is a schematic circuit diagram of a part of another embodiment according to this invention.

At least the two adjacent diodes of the rectifier bridge 34 may be replaced with zener diodes instead of providing the zener diode 36. The abnormal voltage rise can be also limited on the alternating current side of the rectifier bridge 34. FIG. 7 shows a circuit wherein a saturable reactor 40 is connected in parallel to the resistor 32. The saturable reactor 40 is not to be saturated by the normal voltage rise, but is saturated by an abnormal voltage rise to restrain the voltage drop across the resistor 32.

Having thus described the present invention, it is obvious that various modifications within the knowledge of workers in the art may be utilized without departing therefrom.

It is to be understood also that although the invention has been described with specific reference to particular embodiments thereof, it is not to be so limited, since changes and alterations therein may be made which are within the full intended scope of this invention, as defined by the appended claims.

What is claimed is:

1. A voltage control apparatus for an alternating current generator having a field winding comprising a motor in driving connection with said generator, voltage control rectifier means for exciting the field winding of said generator with the rectified output voltage of said generator, phase shifter means for controlling said control rectifier means in response to an applied control signal, a saturable reactor excited by the output of said generator, a rectifier connected in series with said reactor across the output of said generator and to said phase shifter means for rectifying the current flowing through said reactor and supplying the rectified current as said control signal to said phase shifter means, and bypassing means connected to the alternating current side of said rectifier to partially bypass the current of said reactor.

2. A voltage control apparatus according to claim 1 wherein said reactor has an auxiliary winding and a main winding, and means for selectively connecting portions of said auxiliary winding in series with said main winding so as to change the number of turns and polarity of said reactor.

3. A voltage control apparatus according to claim 1 further comprising a transformer having a primary winding connected across the output of said generator and a secondary winding connected to said reactor for matching the output voltage of said generator with the voltage for exciting said reactor.

4. A voltage control apparatus according to claim 3 wherein said transformer has an auxiliary winding and a main winding on the secondary side, and means for selectively connecting portions of said auxiliary winding in series with said main winding so as to change the number of turns.

5. A voltage control apparatus according to claim 1 further comprising a limiter connected to said reactor for limiting the output current of said reactor.

6. A voltage control apparatus according to claim 5 wherein said limiter is a zener diode provided across a direct current output side of said rectifier.

7. A voltage control apparatus according to claim 5 wherein said limiter is an additional saturable reactor provided across an alternating current input side of said rectifier.

8. A voltage control apparatus for a self-excited alternating current generator having a voltage control rectifier arrangement connecting the output of the generator to its field winding, comprising phase shifter means for controlling said control rectifier arrangement in response to an applied control signal to vary the phase angle of conduction thereof, control means for generating said control voltage including a saturable reactor excited by the output of said generator and rectifier means connected in series with said reactor across the output of said generator and to said phase shifter means for rectifying the current flowing through said reactor and supplying the rectified current as said control signal to said phase shifter means, and bypassing means connected across the alternating current side of said rectifier means for partially bypassing the current of said reactor.

9. A voltage control apparatus according to claim 8 wherein said rectifier means is formed by a four diode rectifier bridge and said bypassing means is formed by a resistor connected across the input of said bridge.

10. A voltage control apparatus according to claim 9 wherein said resistor has a value to provide a voltage drop smaller than the voltage drop of the pair of diodes forming the input of said bridge.

11. A voltage control apparatus according to claim 9 wherein an additional saturable reactor is connected in parallel with said resistor.

12. A voltage control apparatus according to claim 9 further comprising a transformer connected between said generator and said reactor for matching the output voltage of said generator with the voltage for exciting said reactor.

13. A voltage control apparatus according to claim 12 further comprising a limiter connected to said reactor for limiting the output current of said reactor.

14. A voltage control apparatus according to claim 13 wherein said limiter is a zener diode provided across a direct current output side of said rectifier.

* * * * *